J. BRAIN.
AUTO TURN TABLE.
APPLICATION FILED SEPT. 18, 1918.
1,291,747.
Patented Jan. 21, 1919.
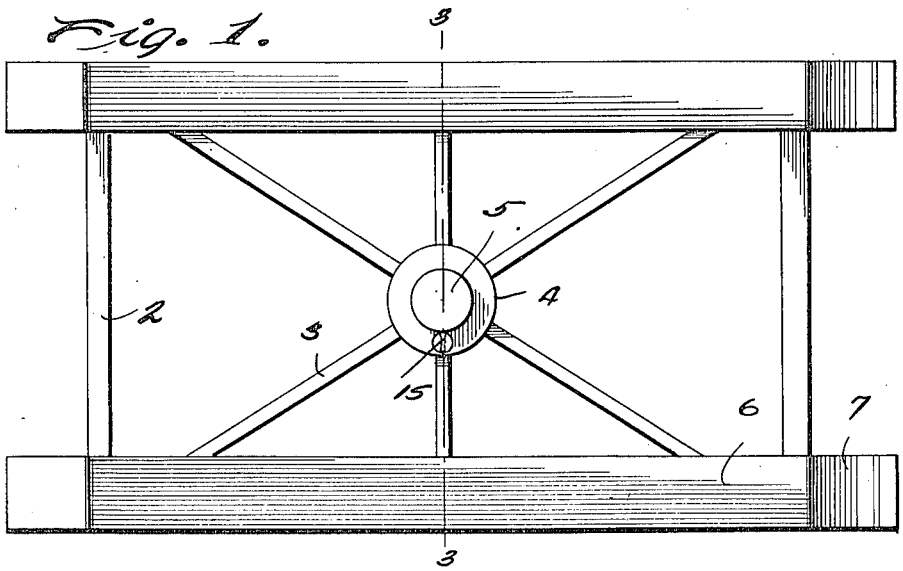
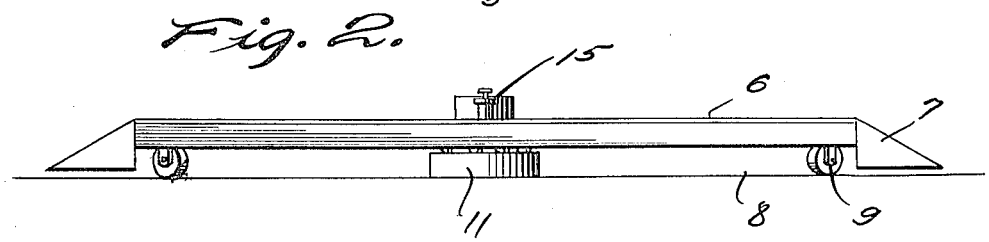
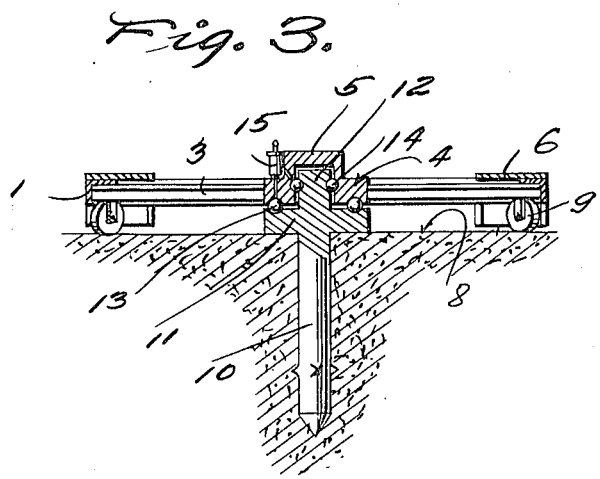
Inventor
Jacob Brain

UNITED STATES PATENT OFFICE.

JACOB BRAIN, OF CLIFTON, NEW JERSEY.

AUTO TURN-TABLE.

1,291,747.  Specification of Letters Patent.  Patented Jan. 21, 1919.

Application filed September 18, 1918. Serial No. 254,609.

*To all whom it may concern:*

Be it known that I, JACOB BRAIN, a citizen of the United States, residing at Clifton, in the county of Passaic and State of New Jersey, have invented certain new and useful Improvements in Auto Turn-Tables, of which the following is a specification.

This invention relates to turntables, and more especially to those employed for automobiles and other light vehicles; and the object of the invention is to produce a turntable which may be mounted on the floor of the garage or stable and by means of which the vehicle can be turned around therein.

The invention consists in the special means for pivoting and supporting the turntable, so that it may stand as close to the floor as possible and so that it will not require much material.

Details are set forth in the following specification and claims, and reference is made to the drawings, wherein:—

Figure 1 is a plan view, and

Fig. 2 an edge view of this turntable complete,

Fig. 3 is a section on the line 3—3 of Fig. 1.

This structure comprises angle iron side bars 1 connected by cross bars 2 which may also be angle iron, the whole braced by oblique T-bars 3 leading to a hub 4 at the center, which hub has its top 5 closed, as seen in Fig. 3. Overlying the side bars are flat metallic strips constituting tracks 6, and at each end of each track is an inclined riser 7 carried by the framework and so disposed that it will just clear the floor as indicated by letter 8, the ends of the side bars being supported by caster wheels 9.

A post 10 is seated in the floor, above which it has a head 11 and a central plug 12 rising from the same. The upper face of the head and lower face of the hub are channeled to form races for a series of balls 13, and the sides of the plug and inner wall of the hub are channeled for another series of balls 14, means 15 being provided for feeding oil to both series.

Thus the structure is pivotally supported on and centered by the post 10, upon and around whose head it is mounted by ball bearings, but the latter are thoroughly protected from dirt and other material which might otherwise accumulate and choke the ball bearings. The extremities of the tracks and the corners of the frame are supported by caster wheels so that the structure will not sag under the weight of the vehicle. The risers permit the same to be run onto the turntable from either end, and when the wheels rest on the tracks the vehicle and turntable may be rotated on its pivot by hand. Assuming that the garage or stable is of sufficient width, it will therefore be easy to turn the automobile around within the structure, so that it can run out head-on which is often desirable. This device also meets a long-felt want in repair shops where it often becomes necessary to reverse the position of a motor vehicle or truck, for reasons which need not be set forth herein.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:—

1. The herein described motor vehicle turntable having a hub at its center, a post seated in the floor and upon which said hub is swivelly mounted, and casters under the corners of the frame resting constantly on the floor.

2. The herein described motor vehicle turntable comprising a frame structure, a hub at its center provided with a closed top, and braces connecting the frame with the hub; a post in the floor, ball bearings between the upper end of the post and hub, and caster wheels under the ends of the frame.

3. In a turntable of the class described, the combination with a central post mounted in the floor; of a frame structure including a central hub, ball bearings mounting it on said post, tracks along the sides of the frame, caster wheels under the ends of the tracks, and inclined risers at the extremities of the track held above the ground by the constant contact of said wheels with the floor.

In testimony whereof I affix my signature in presence of two witnesses.

JACOB BRAIN.

Witnesses:
 JNO. E. ACKERMAN,
 MICHAEL SHINE.